United States Patent
Stewart et al.

(10) Patent No.: US 7,266,884 B2
(45) Date of Patent: Sep. 11, 2007

(54) APPARATUS FOR CUTTING AND REMOVING WEDGES OF A STATOR CORE OF AN ELECTRICAL MACHINE

(75) Inventors: Gary Lindsey Stewart, Monroeville, PA (US); Kenneth John Hatley, Madison, NJ (US); Richard Michael Hatley, Morristown, NJ (US); Sean Michael McDonnell, Union, NJ (US); Michael John Bousquet, Hewitt, NJ (US); Frank Harold Applegate, Springfield, NJ (US)

(73) Assignee: General Electric, Company, Schenectady, NY (US)

( * ) Notice: Subject to any disclaimer, the term of this patent is extended or adjusted under 35 U.S.C. 154(b) by 463 days.

(21) Appl. No.: 10/909,284

(22) Filed: Aug. 3, 2004

(65) Prior Publication Data
US 2006/0026818 A1   Feb. 9, 2006

(51) Int. Cl.
*B23P 19/00* (2006.01)
(52) U.S. Cl. .............................. 29/732; 29/734; 29/735; 29/596; 29/252; 29/253; 310/214
(58) Field of Classification Search ............ 29/596–598, 29/732–734, 252–256; 310/214–215, 194, 310/260, 42; 336/196–197; 83/167, 212, 83/468, 580
See application file for complete search history.

(56) References Cited

U.S. PATENT DOCUMENTS

| | | | | |
|---|---|---|---|---|
| 4,495,692 | A | * | 1/1985 | Walker ..................... 29/564.1 |
| 5,075,959 | A | * | 12/1991 | Keck et al. ................... 29/734 |
| 5,414,617 | A | * | 5/1995 | Pomerleau et al. ........... 700/11 |
| 6,294,855 | B1 | | 9/2001 | Kelleher |
| 6,526,647 | B2 | * | 3/2003 | Hatley et al. ................. 29/596 |
| 6,584,680 | B2 | | 7/2003 | Iversen et al. |
| 6,708,395 | B2 | * | 3/2004 | Pezzano et al. ............... 29/732 |
| 2006/0026818 | A1 | * | 2/2006 | Stewart et al. ................ 29/596 |

\* cited by examiner

*Primary Examiner*—Minh Trinh
(74) *Attorney, Agent, or Firm*—Nixon & Vanderhye, PC

(57) ABSTRACT

The wedge removal apparatus includes an elongated frame having telescopic elements at opposite ends with cylinders to engage pads along opposite sides of the frame against diametrically opposed wedges of stator core slots. The frame mounts a linear drive assembly carrying a carriage for longitudinal movement relative to the drive assembly and frame. The carriage mounts diametrically opposed heads and a cylinder displaces the heads radially outwardly to engage the wedges and compress underlying ripple springs. Saws carried by the heads cut through the wedges as the carriage is displaced along the frame and without binding because of the force applied to the wedges compressing the ripple springs. The linear drive assembly is rotated to discrete circumferential positions to cut the wedges of additional diametrically opposed slots.

6 Claims, 6 Drawing Sheets

APPARATUS FOR CUTTING AND REMOVING WEDGES OF A STATOR CORE OF AN ELECTRICAL MACHINE

BACKGROUND OF THE INVENTION

The present invention relates to apparatus and methods for removing wedges overlying the windings of a stator core in an electrical machine and particularly relates to apparatus and methods for cutting the wedges longitudinally parallel to the slots to facilitate removal of the wedges and refurbishment of the machine.

In electrical machines such as generators, the stator core has a slot wedging system for retaining the windings in the core. The windings are arranged in circumferentially spaced, longitudinally extending slots, which, along radially inward ends of the slots have dovetail or tapered surfaces. A plurality of wedges typically extend along the length of each circumferentially spaced slot to retain the windings in the slot. The radial outer sides of the wedges are tapered and tapered slides underlie the wedges, forcing the wedges radially inwardly against the dovetail slots. In recent electrical machine construction, ripple springs underlie the slides or wedges and bias the wedges in a radial inward direction. The ripple springs can apply as much as 3500 pounds force to the wedges.

It is common practice to rewedge or rewind the stator core during refurbishment, thus necessitating the removal of the wedges. The wedges are typically removed by sawing them in half in a longitudinal direction. In the past, where ripple springs have not been used, handsaws were used to split the wedges and remove them from the stator core. When biasing the wedges using ripple springs, however, the ripple springs cause the wedge halves to move toward one another as the cut is being made. That is, the action of the ripple spring causes the wedges to bind the cutting blade, causing slippage and tool and core damage as well as generating a potential for injury to the operator. Efforts to remove wedges biased by ripple springs have resulted in labor-intensive, tedious, slow and expensive processes, typically using hand-chisels. Accordingly, there is a need for apparatus and methods for safely, inexpensively and expeditiously removing wedges from a stator core.

BRIEF DESCRIPTION OF THE INVENTION

In a preferred embodiment according to the present invention, there is provided a method of removing wedges in axially extending slots in a stator core of an electrical machine wherein springs in the stator core bias the wedges radially inwardly, comprising the steps of (a) disposing a frame carrying a carriage in the stator core, (b) providing cutter heads on the carriage diametrically opposite one another, (c) engaging the heads against diametrically opposed wedges of the stator core, (d) applying a force to the wedges through the heads in a direction against the bias of the springs; and (e) cutting the wedges in a direction generally parallel to an axis of the stator core.

In a further preferred embodiment according to the present invention, there is provided a method for removing wedges in axially extending slots of a stator core of an electrical machine, comprising the steps of (a) disposing a frame within the core extending between diametrically opposite wall portions of the stator core, (b) providing a carriage carrying a cutter head, the carriage being carried by the frame for pivotal movement about the axis of the stator core to position the cutter head carried thereby adjacent a wedge in a first slot of the stator core, (c) displacing the cutter head in an axial direction to cut a plurality of the wedges longitudinally in the slot to enable removal of the wedges and (d) pivoting the carriage about the axis to locate the cutter head adjacent a wedge in another slot circumferentially spaced from the first slot.

In a further preferred embodiment according to the present invention, there is provided apparatus for cutting wedges in axially extending slots in a stator core of an electrical generator, comprising a frame receivable within the stator core, a carriage carried by the frame for axial movement along the stator core and relative to the frame, diametrically opposed heads carried by the carriage and a cutter carried by each of the heads for cutting the diametrically opposed wedges as the carriage and heads move axially relative to the stator core.

DETAILED DESCRIPTION OF THE INVENTION

Figure 1:
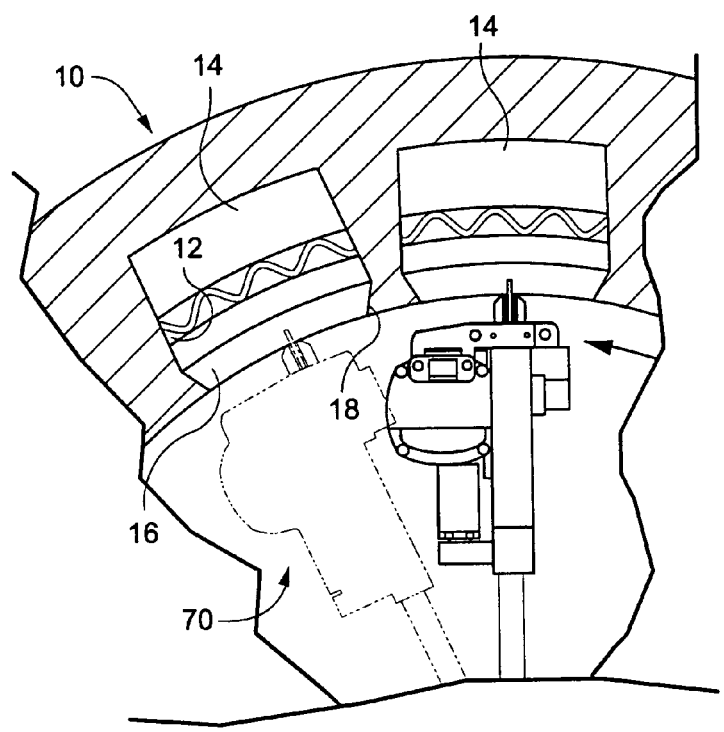
FIG. 1 is a fragmentary axial cross sectional view of a stator core illustrating the wedges, wedge slots and portions of a wedge removal apparatus according to a preferred aspect of the present invention.
Figure 1:
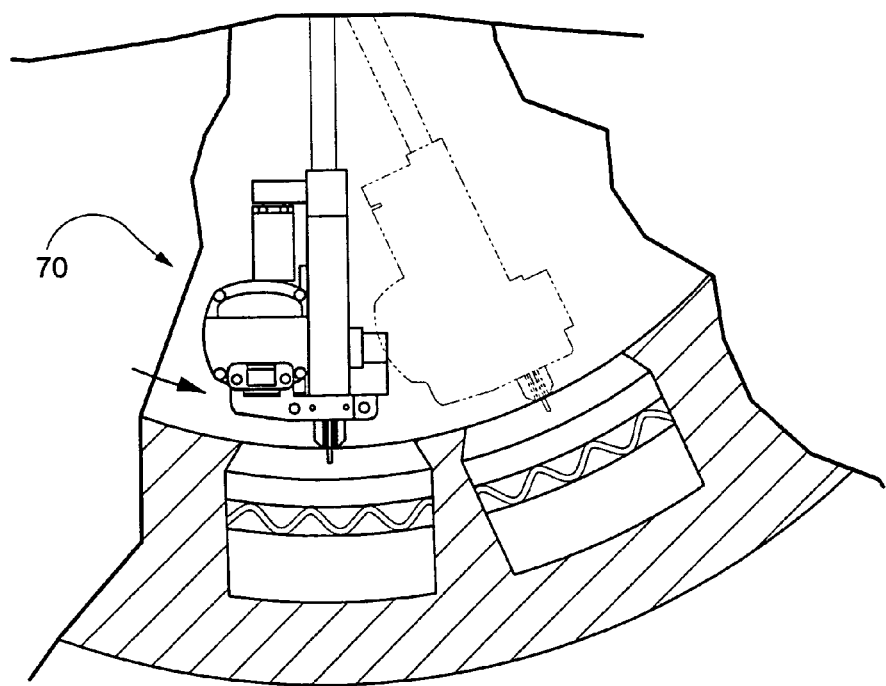
Figure 2:
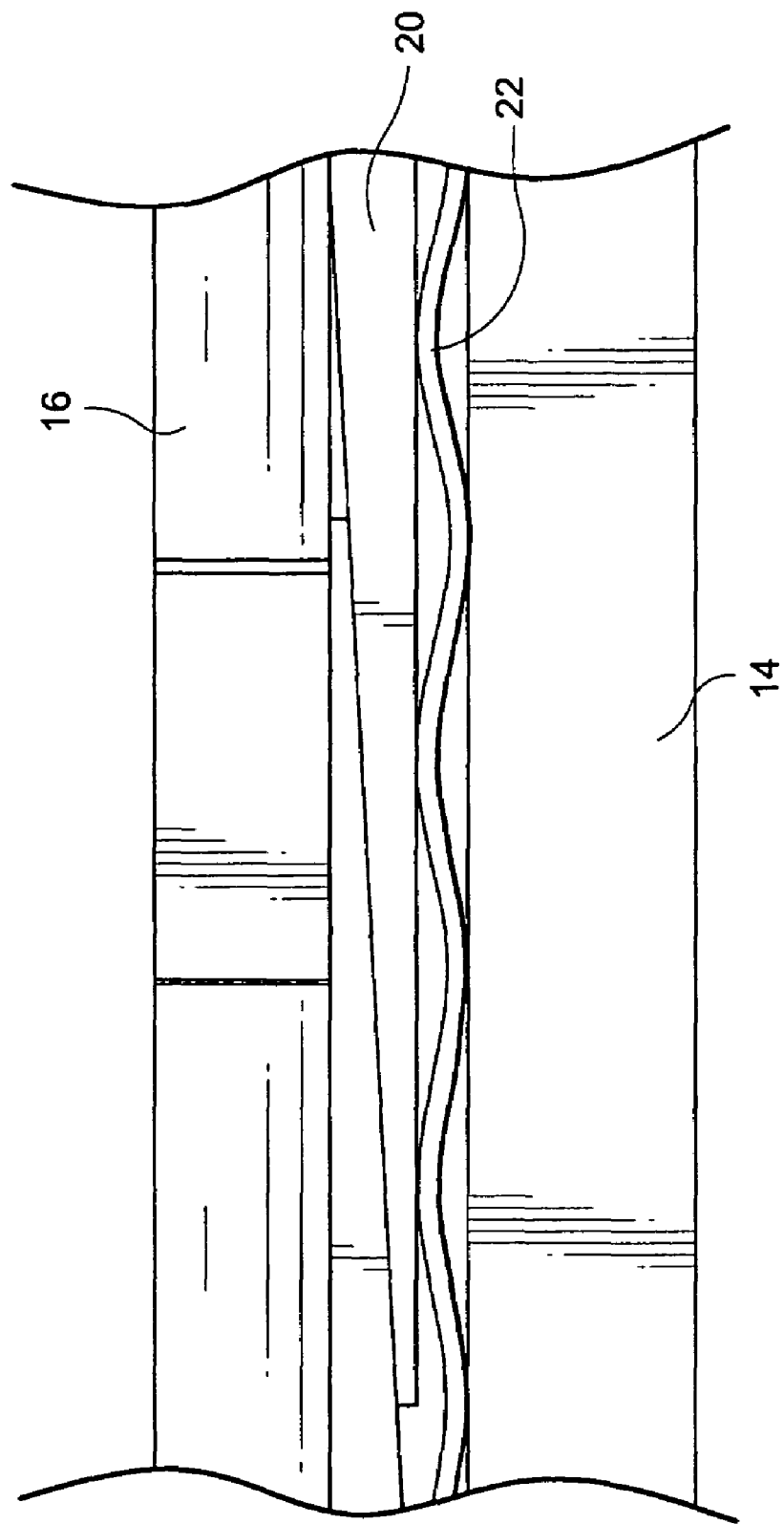
FIG. 2 is a fragmentary side elevational view illustrating a wedge, a slide, a ripple spring and windings in a stator core slot.

Referring now to the drawings, particularly to FIG. 1, there is illustrated a stator core generally designated 10 forming part of an electrical machine such as an electrical generator. The stator core 10 has a plurality of longitudinally extending slots 12 spaced circumferentially one from the other and opening in a radial inward direction. Windings 14 are disposed in the slots 12. As illustrated in FIGS. 1 and 2, the radially inwardly opening slots 12 are closed by wedges 16 which have tapered surfaces 18 for cooperation with complementary tapered surfaces along the length of the slots adjacent the radially inner opening of the slots to retain the windings within the slots 12. The undersurfaces of the wedges 16 are tapered as illustrated in FIG. 2 and tapered slides 20 underlie the wedges 16 to maintain the wedges 16 in the tapered or dovetail shaped groove of the slots. Ripple springs 22 underlie the slides 20 and lie between the slides 20 and the windings 14. The ripple springs 22 compress the slides and wedges radially inwardly with substantial force. When refurbishing the electrical machine, for example, providing rewinding, the wedges 16 are required to be removed. It will be appreciated that substantial radial inward force, e.g., on the order of 3500 pounds, is applied to the wedging system, rendering the wedges difficult to remove, particularly since saws used to cut the wedges tend to bind up under the force of the ripple springs.

Figure 3:
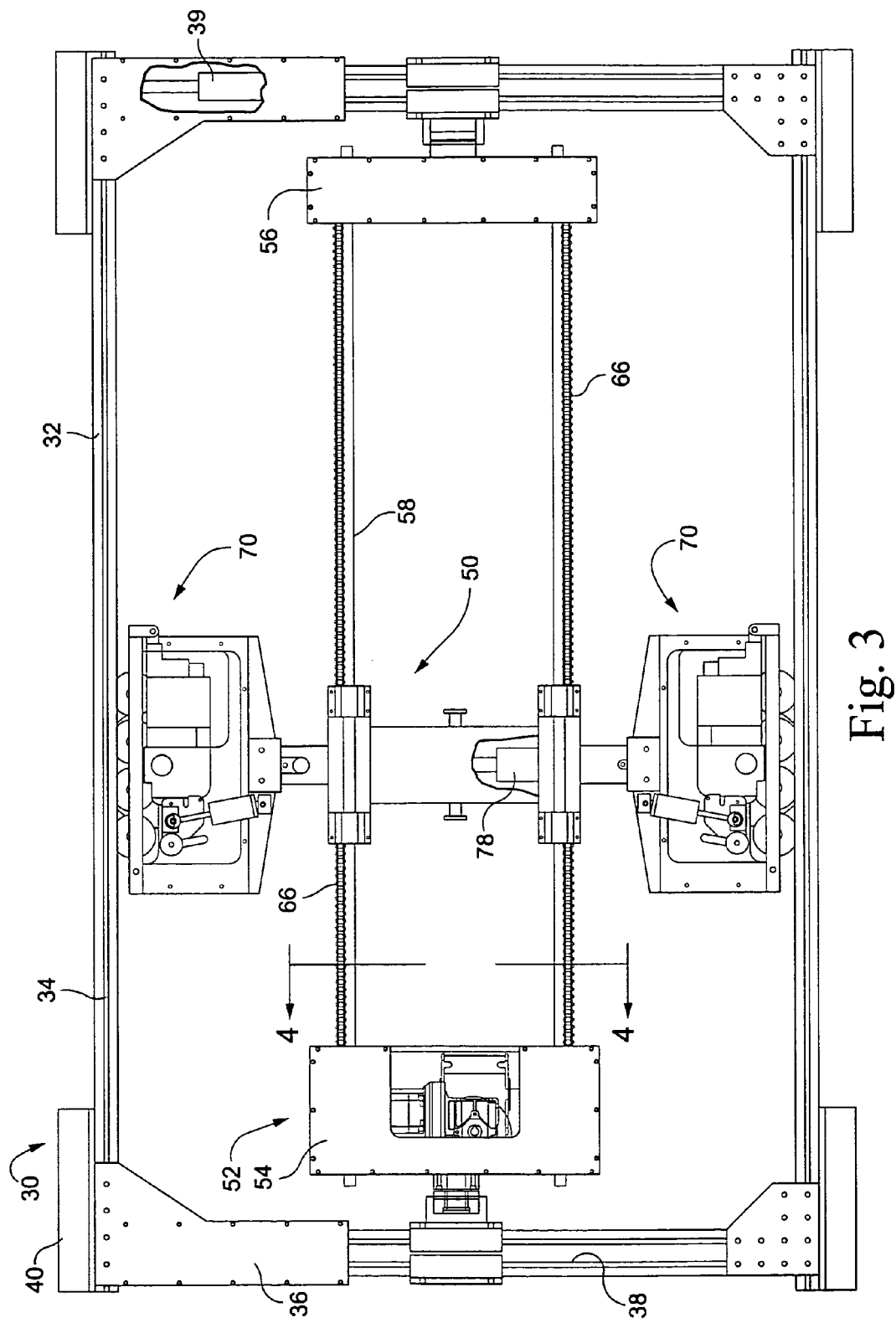
FIG. 3 is a side elevational view of the wedge removal apparatus hereof.

A wedge removal assembly is illustrated in FIG. 3. The assembly generally designated 30 includes a substantially rectilinear outer frame 32 which lies generally in a single plane. The frame 32 includes longitudinally extending support members 34 connected to diametrically extending radial elements 36 and 38 forming end stanchions. The radial elements 36 and 38 are telescopically related to one another and are provided with a hydraulic ram arrangement 39 for extending and retracting the members 34 diametrically toward and away from the slots of the stator core. Outer edges of the longitudinal members 34 at opposite ends of the frame 30 are provided with pads 40 for bearing against the wedges of diametrically opposed slots.

It will be appreciated that the frame 30 is disposed longitudinally within the stator core with elements 36 and 38 extending diametrically within the core. Upon actuation of the hydraulic ram 39, the pads 40 are engaged against the wedges 16 in diametrically opposed slots.

The frame 30 mounts a carriage assembly generally designated 50 on a linear drive assembly generally designated 52. The linear movement assembly 52 includes a drive box 54 and an idler box 56 at opposite ends and adjacent opposite ends of the frame. The drive box 54 and idler box 56 are pivotally carried by bearings mounted on the end stanchions 36, 38 of the frame 30. Preferably, the linear drive assembly 52 is mounted for rotation about the stator core axis. Four rails or bars 58 extend between the drive and idler boxes 54 and 56, respectively, and the carriage 50 is slidably mounted on the bars or rails 58 for axial sliding movement along the bars or rails between opposite ends of the linear drive assembly 52.

Figure 4:
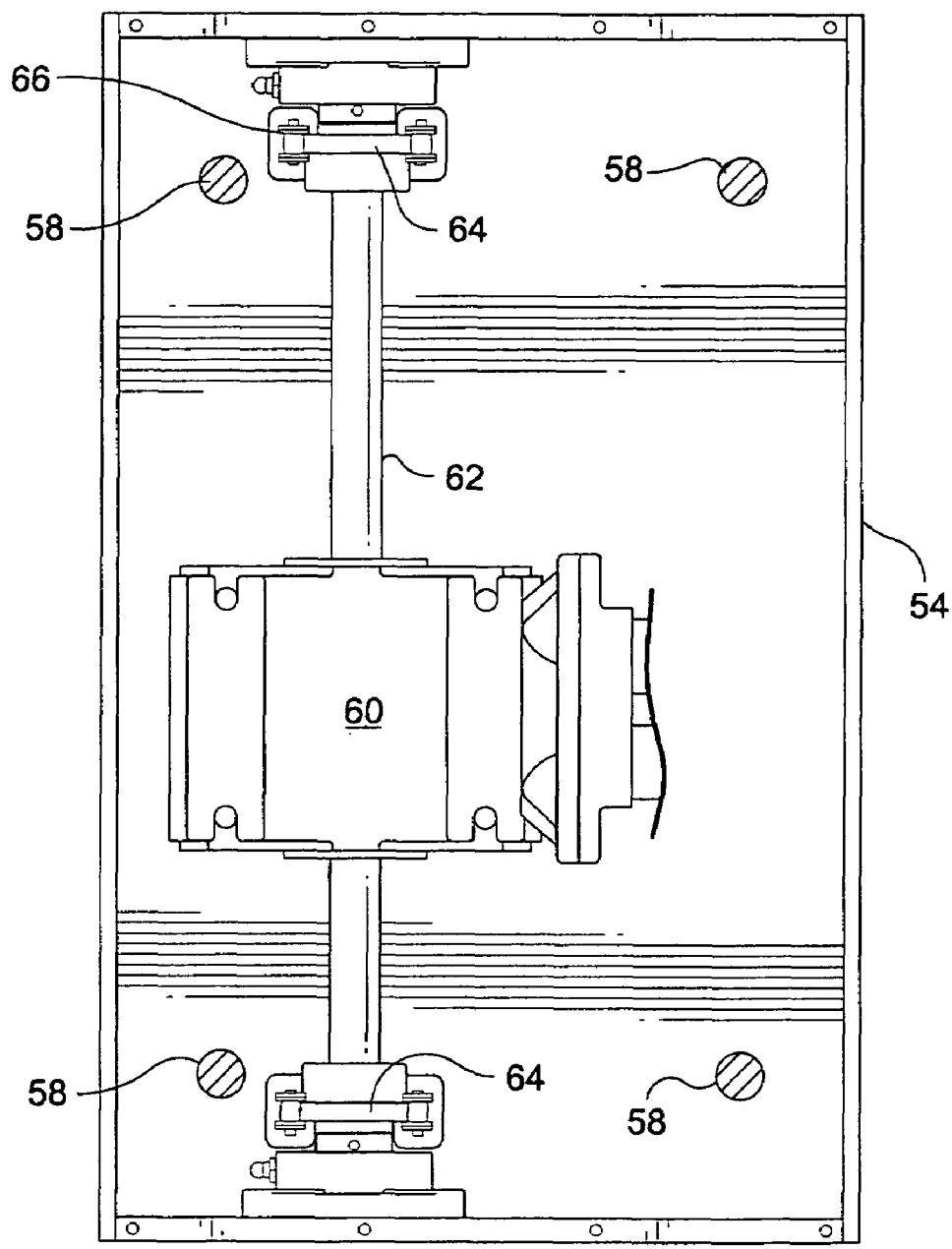
FIG. 4 is a cross sectional view taken generally about on line 4-4 in FIG. 3.

Referring to FIG. 4, the drive box 52 includes an electric motor 60 for driving a shaft 62 in corresponding directions. Mounted adjacent opposite ends of shaft 62 are drive sprockets 64 for driving chains 66. Opposite ends of each chain 66 is connected to the carriage 50. The chains 66 extend longitudinally about idler sprockets, not shown, carried by the idler box 56. Consequently, by energizing motor 60 and driving shaft 62, the chains 66 translate or drive the carriage 50 along the bars 58 in selected opposite longitudinal directions.

Figure 5:
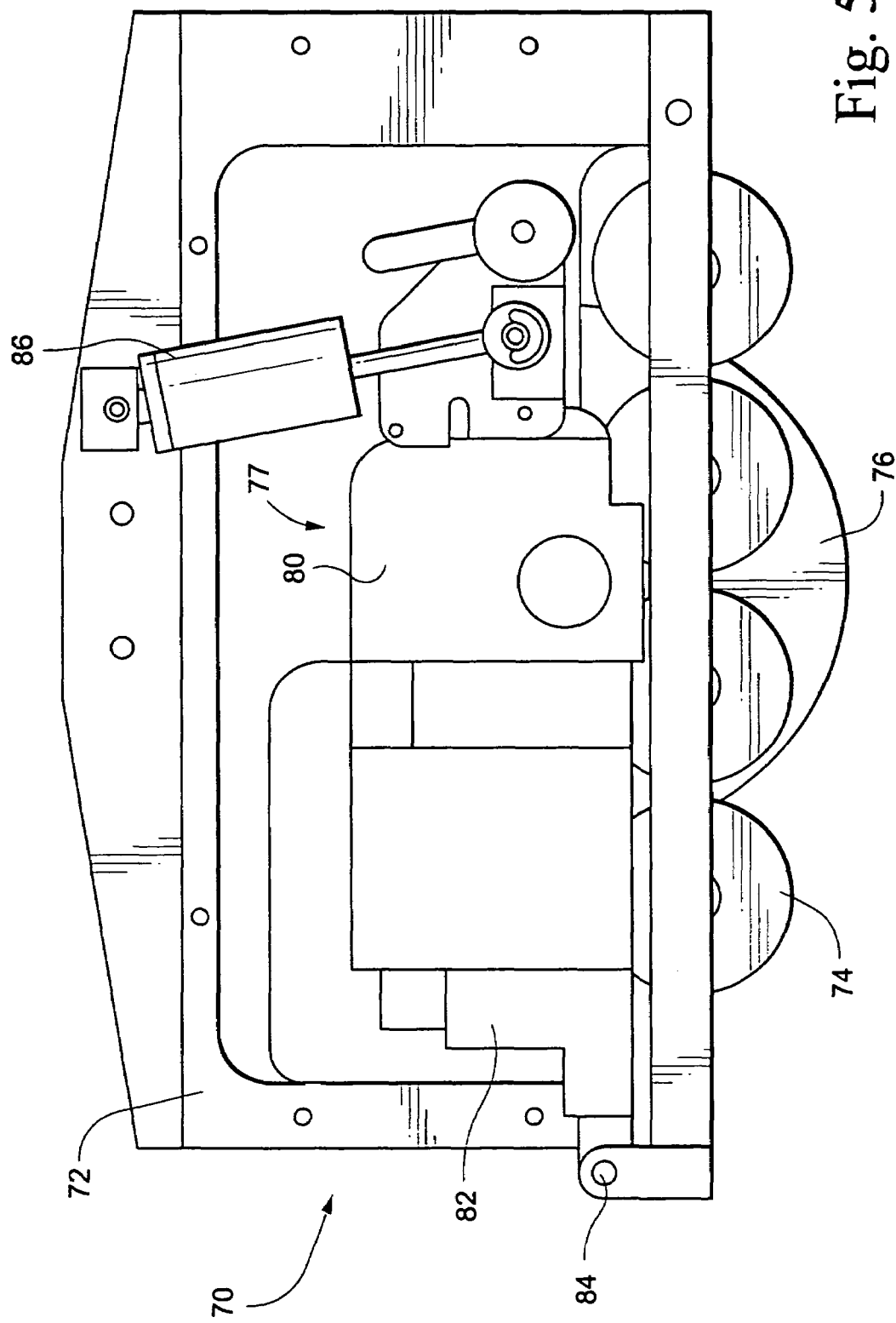
FIG. 5 is an enlarged side elevational view of a cutter head illustrating a saw blade.
Figure 6:
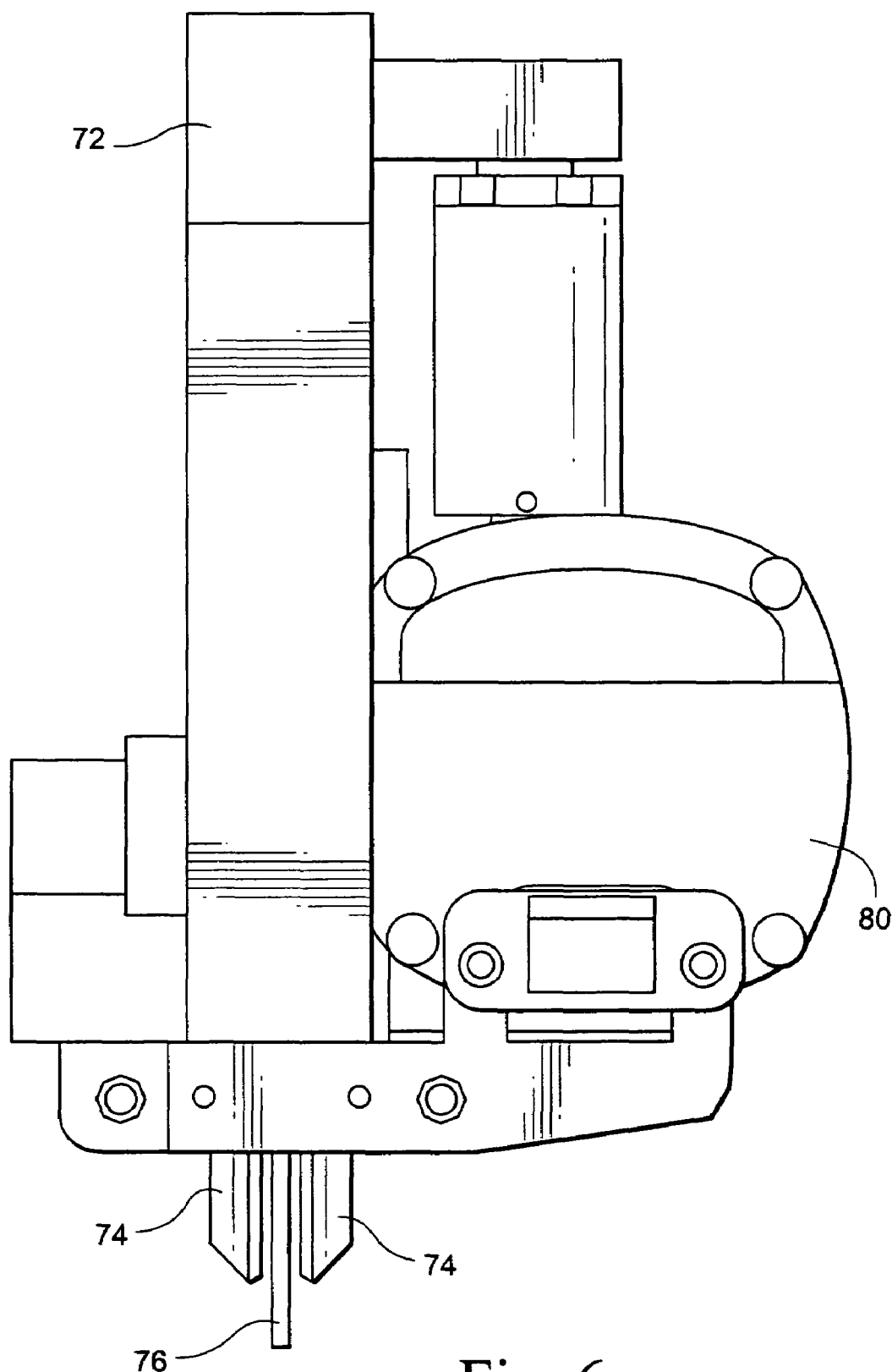
FIG. 6 is a end elevational view of the cutter head.

Carriage 50 mounts a pair of diametrically opposed cutter heads generally designated 70 as best illustrated in FIGS. 5 and 6. The cutter heads 70 include generally rectilinear frames 72 mounting a plurality of rollers 74 at radial outer ends. Rollers 74 straddle a saw blade 76 of a saw 77 as best illustrated in FIG. 6, there being preferably four rollers on each of the opposite sides of the saw blade 76. The carriage 50 also includes a hydraulic cylinder 78 (FIG. 3) for displacing the cutter heads 70 radially outwardly and inwardly. Consequently, by actuating the cylinder 78, the rollers 74 of the respective heads 70 may engage the wedges in diametrically opposite slots of the stator core. As described below, sufficient force is applied by the cylinder 78 to the rollers and consequently to the diametrically opposed wedges to compress the ripple springs underlying the wedges, enabling the saw blade 76 to cut through the wedges without binding.

Referring to FIG. 4, each saw blade 76, preferably rotary saw 77, is illustrated in an extended radially outward cutting position. The saw blade 76 is driven by an electric motor 80 mounted on a chassis 82 pivotally coupled at 84 to the rectilinear frame 72. An air cylinder 86 adjacent the opposite end of the motor 80 from pivot 84 interconnects the frame 72 and the motor 80 for pivoting the saw blade 76 between a radial inward non-wedge contacting position and a radial outward sawing position vis-à-vis the wedge, the sawing or cutting position being illustrated in both FIGS. 5 and 6. The saw blade 76 may be retracted radially inwardly to a position inwardly of the rollers 74.

To utilize the wedge removal system hereof, the frame 30 is disposed longitudinally within the stator core 10 with the pads 40 aligned with diametrically opposite wedges of diametrically opposed stator core slots. The hydraulic cylinders or rams 39 in each of the stanchions 36, 38 are actuated to engage the diametrically opposed wedges 16 and secure the frame within the stator core. It will be appreciated that the frame 30 extends a limited length within the stator core and is repositioned longitudinally upon successful completion of cutting the wedges at the location of the wedge removal assembly to further longitudinal positions to complete the cutting of the wedges in each of the slots.

With the frame 30 fixed within the stator core, the linear drive assembly 52 including the carriage assembly 50 and heads 70 are rotated into a position aligning the heads 70 with diametrically opposed wedges in slots circumferentially spaced from the slots having wedges engaged by the frame pads 40. For example, as illustrated in FIG. 1, the linear assembly 52 is rotated to align the heads 70 with wedges diametrically opposed adjacent the diametrically opposed wedges engaged by the pads 40. Once the linear assembly 52 is aligned with the wedges of the adjacent slots, the hydraulic cylinder 78 is actuated to displace the heads 70 radially outwardly to engage the rollers 74 against the wedges. Sufficient force is applied to the head 70 by cylinder 78 acting through the rollers 74 to compress the ripple springs 22 underlying the wedges 16. With the ripple springs 22 compressed, the electric motors 80 for the saw blades 76 are actuated. The air cylinders 86 are also actuated to pivot the saw blades 76 into engagement with the wedges to cut through central portions thereof in a longitudinal direction.

With the saw blades engaged and cutting the wedges, the linear drive assembly 52 is actuated to draw the carriage 50 and consequently the heads and saw blades 76 longitudinally along the wedges of the slots whereby the wedges are cut. It will be appreciated that by maintaining the wedges under radial outward pressure with the ripple springs compressed, the saw blades are able to cut through the wedges without the wedges binding the saw blades as would be the case if the ripple springs were not compressed. When each saw blade reaches the end of its travel, the air cylinder 86 is actuated to withdraw the saw blade from the last wedge cut. Additionally, the cylinder 78 is actuated to displace the heads 70 in radially inward directions out of engagement with the cut wedges. The carriage 50 is then displaced longitudinally to its start position along the linear drive assembly by driving the chains 66 in a reverse direction. With the heads spaced radially inwardly of the wedges, the linear drive assembly 52 is manually rotated about its axis to align the heads 70 with the next circumferentially adjacent slots and wedges. Upon alignment, the cylinder 78 is actuated to displace the heads 70 radially outwardly to engage and apply sufficient forces to the wedges to compress the ripple springs. The previously described process is repeated by engaging the saws with the wedges and displacing the carriage 50 along the drive assembly to cut the wedges. It will be appreciated that the heads 70 and saw blades are then withdrawn from the cut wedges and the linear drive assembly displaces the carriage back to the start position for rotation into a further circumferential position to cut wedges of further circumferentially spaced slots.

Upon completion of the cutting operations for all circumferentially spaced slots except for the slots mounting the frame 32, the hydraulic rams 39 at opposite ends of the frame 32 can be retracted to release the frame from the stator core. The frame is then rotated to engage diametrically opposed adjacent slots which have been cut. The operation is then repeated with the cutting heads 70 aligned with the remaining two diametrically opposed uncut wedges of diametrically opposed slots. Once these slots have been cut, the wedge removal operation for that length or section of the stator core is complete. The frame is then removed from that portion of the stator core and advanced longitudinally to another section of the stator core to repeat the foregoing described process to cut the wedges of the slots in the next core section.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An apparatus for cutting wedges in axially extending slots in a stator core of an electrical generator, comprising:
   a frame receivable within the stator core;
   a carriage carried by said frame for axial movement along the stator core and relative to said frame;
   diametrically opposed heads carried by said carriage; and
   a cutter carried by each of said heads for cutting the diametrically opposed wedges as the carriage and heads move axially relative to the stator core.

2. The apparatus according to claim 1 including a fluid-actuated cylinder carried by said carriage for applying a radially outwardly directed force against the diametrically opposed wedges being cut by the cutter.

3. The apparatus according to claim 1 wherein each of said cutters comprises a saw, said saws being pivotally carried by said heads for movement between positions spaced radially inwardly of the wedges and cutting positions cutting axially along the wedges.

4. The apparatus according to claim 1 wherein said carriage is carried by said frame for pivotal movement about an axis parallel to the axis of the stator core, enabling the cutters to cut wedges circumferentially spaced from one another about the stator core.

5. The apparatus according to claim 1 wherein said frame includes pads at diametrically opposite sides thereof for engaging interior wall portions of the stator core.

6. The apparatus according to claim 5 wherein said frame includes extendable and retractable elements adjacent opposite ends to extend the pads into engagement with the interior wall portions of the stator core and to retract the pads from the interior wall portions of the stator core and including at least one fluid-actuated cylinder for extending and retracting the frame elements.

* * * * *